Jan. 13, 1953  I. H. STEINHARDT  2,625,399

THREE-DIMENSIONAL TAKE-APART PUZZLE

Filed April 13, 1949  7 Sheets-Sheet 1

INVENTOR.
IRVING H. STEINHARDT
BY Edwin Leinroh &
Harry Cohen

ATTORNEYS.

Jan. 13, 1953     I. H. STEINHARDT     2,625,399

THREE-DIMENSIONAL TAKE-APART PUZZLE

Filed April 13, 1949     7 Sheets-Sheet 2

INVENTOR.
IRVING H. STEINHARDT
BY Edwin Leusohn &
Harry Cohen

ATTORNEYS.

Jan. 13, 1953     I. H. STEINHARDT     2,625,399
THREE-DIMENSIONAL TAKE-APART PUZZLE Filed April 13, 1949     7 Sheets-Sheet 4

INVENTOR.
IRVING H. STEINHARDT
BY Edwin Leisohn &
Harry Cohen
ATTORNEYS.

Jan. 13, 1953     I. H. STEINHARDT     2,625,399
THREE-DIMENSIONAL TAKE-APART PUZZLE Filed April 13, 1949     7 Sheets-Sheet 6

INVENTOR.
IRVING H. STEINHARDT
BY Edwin Levisohn &
Harry Cohen
ATTORNEYS.

Patented Jan. 13, 1953

2,625,399

UNITED STATES PATENT OFFICE 2,625,399

THREE-DIMENSIONAL TAKE-APART PUZZLE

Irving Hartley Steinhardt, New York, N. Y.

Application April 13, 1949, Serial No. 87,166

5 Claims. (Cl. 273—160)

This invention relates to puzzles, and more particularly to three-dimensional take-apart puzzles.

It is an object of the present invention to provide a three-dimensional take-apart puzzle which in its fundamental concept may be embodied in various geometric bodies or different simulated objects.

It is another object of the present invention to provide a three-dimensional take-apart puzzle which is characterized especially by its quality of attracting and holding the interest of anyone working the puzzle.

It is another object of the present invention to provide a puzzle which, for it solution, not only requires coordination and interfitting of the pieces thereof in a certain order for their correct assembly, and separation of these pieces in the reverse order for their dis-assembly, but further requires shifting of certain interfitted pieces relative to each other in order to admit other parts into, or remove them from, interfitting relation with other interfitted parts.

It is another object of the present invention to provide a three-dimensional take-apart puzzle having pieces which, when assembled, simulate a baseball, especially by having the externally visible edges of the pieces extend so that they form the simulated seams of the baseball.

The above and other objects, features and advantages of the present invention will be more fully understood from the following description considered in connection with the accompanying illustrative drawings.

Figures 36, 37, 39:
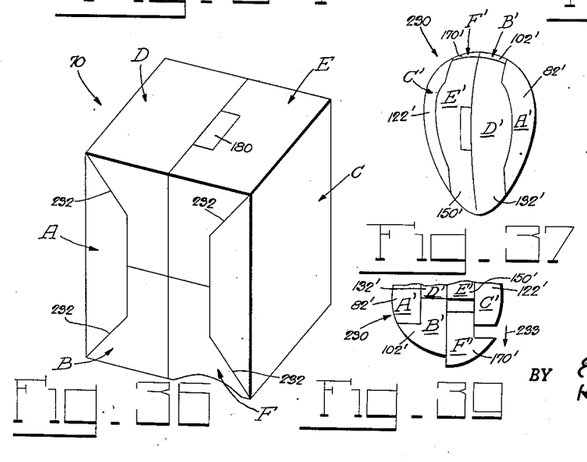
Fig. 36 is a perspective view of the puzzle assembled from the pieces shown in Figs. 1 to 18.
Figs. 37 and 38 are perspective views of a puzzle embodying the present invention in a modified manner.
Fig. 39 is a fragmentary top plan view of the modified puzzle, showing the end piece thereof partially removed.

Referring to the drawings, and more particularly to Fig. 36 thereof, the reference numeral 70 designates an example of a three-dimensional take-apart puzzle which embodies the present invention. The instant puzzle is in the form of a cube, and is composed of several, in the present instance six, separate pieces which may be interfitted in one certain order only for their correct assembly, and separated from each other in the reverse order for their dis-assembly. These pieces are characterized primarily by their different shapes which do not readily suggest their coordination and assembly into finished form, so as to render the task of assembling these pieces highly interesting and absorbing. The various pieces, conveniently identified by the letters A, B, C, D, E and F in the order of their assembly, will now be described.

Figure 1:
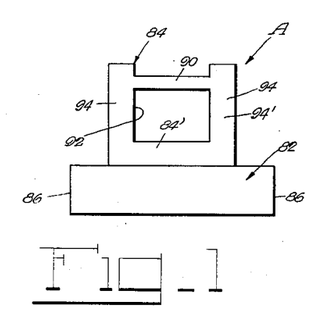
Figs. 1 and 2 are front and side elevational views, respectively, of a piece of a puzzle embodying the present invention.
Figure 2:
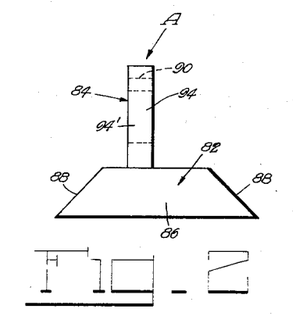

Figs. 1 and 2 show the piece A of the puzzle. This piece comprises a base 82 and a projecting key element 84 which may be made integral with the base 82. The base 82 is, in the present instance, a block of square outline having parallel sides 86 and bevelled sides 88. The key element 84 is essentially U-shaped, having its open end closed by a cross bar or bight portion 90 so as to define a rectangular opening or aperture 92 in the element 84. The cross bar or bight portion 90 is only half as wide (Fig. 1), but is of the same thickness, as the remaining sides of the element 84. Further, the key element 84 is located centrally of the base 82 when viewed in Fig. 1, but is located to one side of the center of the base 82 when viewed in Fig. 2.

Figure 3:
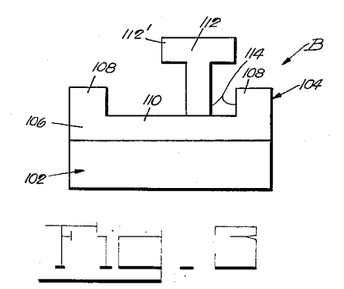
Figs. 3 and 4 are front and side elevational views, respectively, of another piece of the same puzzle.
Figure 4:
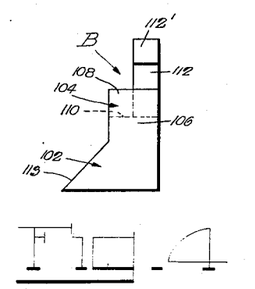

Figs. 3 and 4 illustrate the piece B of the puzzle. This piece comprises a base 102 and a projecting key element 104 which may be integral with the base 102. The base 102 is, in the present instance, exactly one half the size of the base 82 of the piece A, as appears clearly from a comparison between Figs. 2 and 4. The key element 104 comprises a U-shaped portion 106, having opposite legs 108 and a connecting yoke 110 from which projects a T-shaped portion 112 of one-half the thickness of the U-shaped portion 110. In the present instance, the gap 114 between the T portion 112 and the adjacent leg 108 of the U portion of the element 104 is equal to the width of either one of the legs 94 of the interlock element 84 of the piece A. The base 102 of the piece B is provided with one bevelled side 113 which, like the bevelled sides 88 of the base 82 of the piece A, extends at 45° to the bottom surface of the base.

Figure 5:
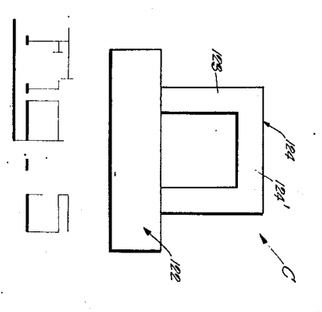
Figs. 5 and 6 are front and side elevational views, respectively, of a third piece of the same puzzle.
Figure 6:
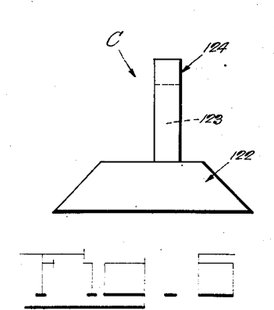
Figure 7:
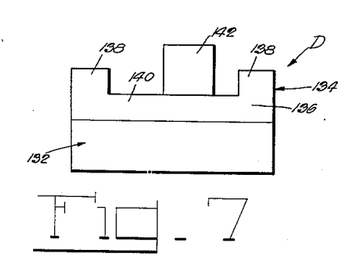
Figs. 7, 8 and 9 are front, side and rear elevational views, respectively, of a fourth piece of the puzzle.
Figure 8:
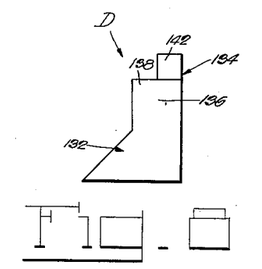
Figure 9:
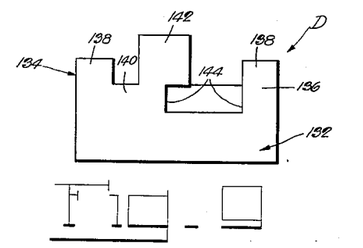
Figure 10:
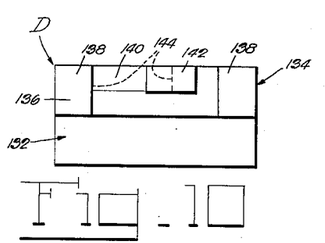
Fig. 10 is a top plan view of the piece shown in Figs. 7 and 9.
Figure 11:
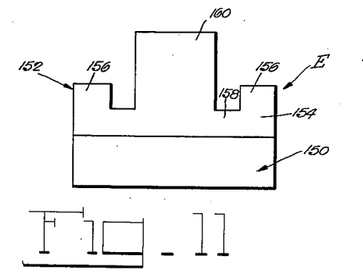
Figs. 11, 12 and 13 are front, side and rear elevational views, respectively, of a fifth piece of the puzzle.

Figs. 5 and 6 show the piece C of the instant puzzle. This piece comprises a base 122 which is in all respects like the base 82 of the piece A, and a projecting key element 124 which is in the form of an inverted U. As shown in Fig. 6, the key element 124 is offset to one side of the center of the base 122.

Figure 25:
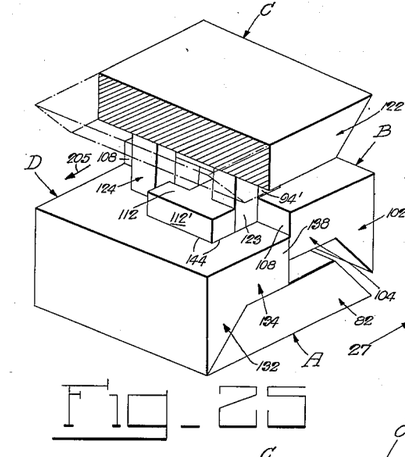
Fig. 25 is a perspective view partly in section, of the first four pieces of the puzzle as shown assembled in Fig. 24.
Figure 26:
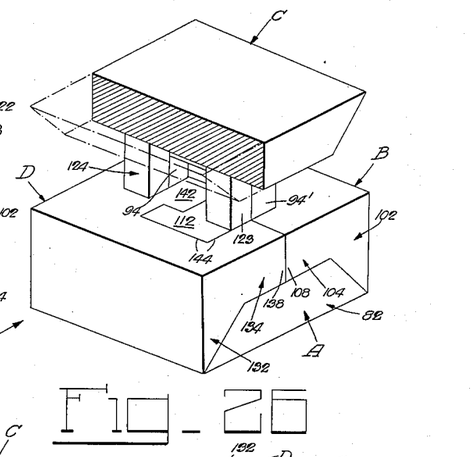
Fig. 26 is a view similar to Fig. 25, showing the fourth piece in its final assembled relation with the first three pieces of the puzzle.

Figs. 7 to 10, inclusive, show the piece D of the puzzle. This piece is a companion to the piece B and comprises a base 132 and a projecting key element 134, having a U-shaped portion 136 with opposite legs 138 and a connecting yoke 140, and a square portion 142 which projects from the yoke 140. The U-shaped portion 136 of the instant piece D (Fig. 8) is of the same thickness as the corresponding U-shaped portion of the piece B (Fig. 4), and is recessed at 144 for the fitted reception of the cross bar 112' of the T-shaped portion 112 of the piece B when the latter is assembled with the instant piece D in inverted relation therewith (Figs. 25 and 26).

Figure 12:
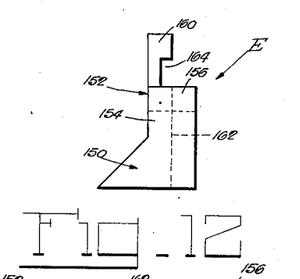
Figure 13:
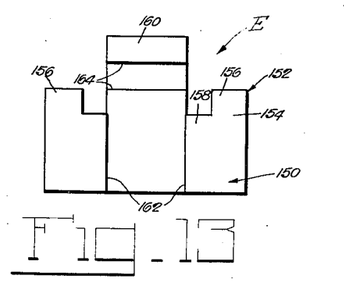
Figure 14:
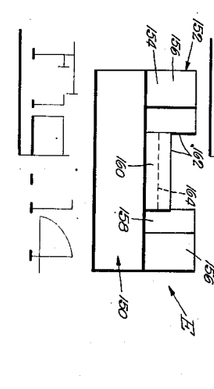
Fig. 14 is a top plan view of the piece shown in Figs. 11 to 13.
Figure 15:
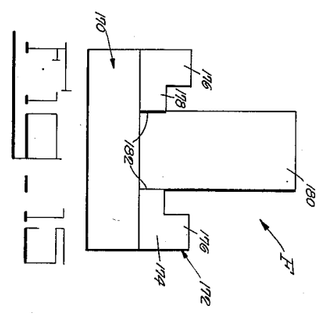
Figs. 15, 16 and 17 are front, side and rear elevational views, respectively, of the end piece of the puzzle.
Figure 16:
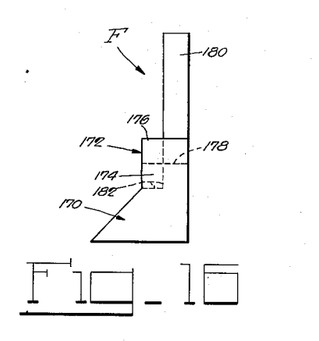
Figure 17:
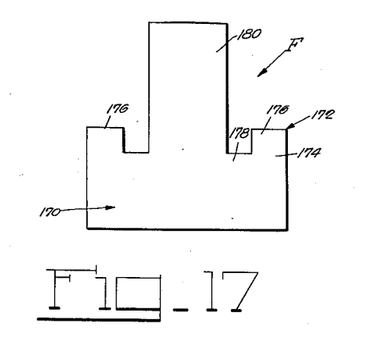
Figure 18:
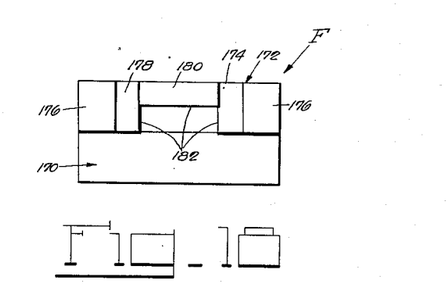
Fig. 18 is a top plan view of the same end piece.
Figures 27, 28, 29, 30, 31:
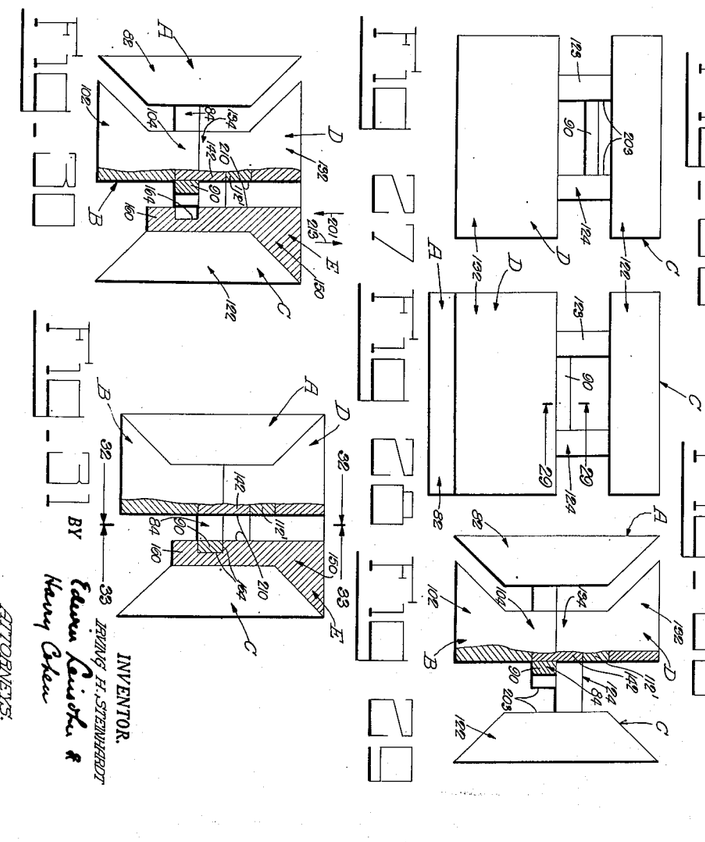
Fig. 27 is a view of the partly assembled puzzle shown, and as viewed in the direction of the arrow 27, in Fig. 26.
Fig. 28 is a view similar to Fig. 27, illustrating the manner in which the partly assembled puzzle is conditioned for the reception of the fifth piece thereof.
Fig. 29 is a side elevation, partly in section, of the pieces shown in Fig. 28, the section being taken on the line 29—29 of Fig. 28.
Fig. 30 is a view similar to Fig. 29, and showing the fifth piece of the puzzle inserted for its subsequent final assembly with the previously assembled pieces of the puzzle.
Fig. 31 is a view similar to Fig. 30, but showing the last inserted piece of the nozzle in its final assembled relation with the previously assembled pieces of the puzzle.

Figs. 11 to 14, inclusive, show the piece E of the puzzle. This piece comprises a base 150 of the same dimensions and shape as the bases 82 and 122 of the pieces A and C, respectively, and a projecting key element 152. The key element 152 is provided with a U-shaped portion 154 with opposite legs 156 and a connecting yoke 158, and a tongue 160 which projects from the yoke 158 and is of half the thickness of the U-shaped portion 154 (Figs. 12 and 14). The base 150 is recessed at 162 so as to be there continuous with the tongue 160 of the key element 152 (Figs. 12 and 13), and the tongue 160 is recessed at 164 for the fitted reception of the cross bar 90 of the piece A (Fig. 31).

Figs. 15 to 18, inclusive, show the end piece F of the puzzle. This piece comprises a base 170 which is in all respects like the bases 102, 132 and 150 of the pieces B, D and E, respectively, and a projecting key element 172. The key element 172 comprises a U-shaped portion 174 with the opposite legs 176 and a connecting yoke 178, and a tongue 180 which projects from the yoke 178. The tongue 180 is of one half the thickness of the U-shaped portion 174 (Fig. 16), and the latter is recessed at 182 to be there flush with the tongue 180.

Figure 19:
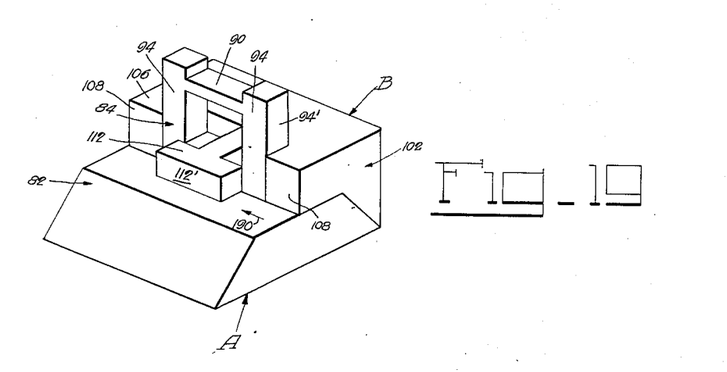
Fig. 19 is a perspective view showing the first two pieces of the instant puzzle in assembled relation.

In putting the puzzle together, the parts A and B thereof are first assemblies in the relation shown in Fig. 19, in which the U-shaped portion 106 of the piece B is interlocked with the legs 94 of the piece A. In order to accomplish this interlock between the pieces A and B, the latter have to be manipulated so as first to extend the cross bar 112' of the T portion 112 of the piece B through the key element 84 of the piece A, then bring the legs 94 of the piece A into alignment with the U portion 106 of the piece B behind the cross bar 112' of the T portion 112 thereof by shifting the piece A, for instance, on the other piece in the direction of the arrow 190 in Fig. 19, and finally move the legs 94 of the piece A into registry with the U portion 106 of the piece B. Next, the piece C is assembled with the previously assembled pieces A and B, by interlocking the key element 124 of the piece C with the T portion 112 of the piece B in the fashion shown in Fig. 20. To this end, the key element 124 of the piece C is first passed over and behind the cross bar 112' of the T portion 112 of the piece B in the direction of the arrow 194 in Fig. 20, and is then shifted at right angles to the arrow 194 into interlocked relation with the T portion 112 of the piece B.

Figures 20, 21, 22, 23, 24:
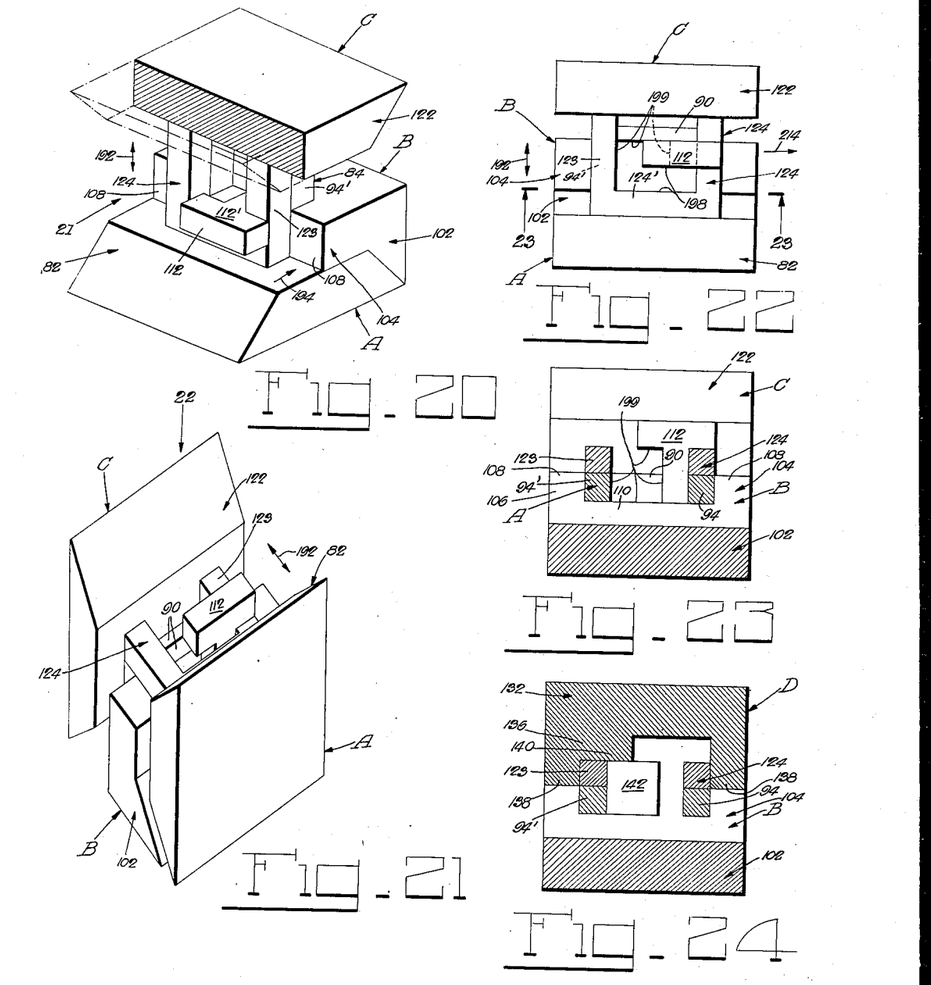
Fig. 20 is a perspective view, partly in section, of the first three pieces of the puzzle in assembled relation.
Fig. 21 is a perspective view showing the pieces of Fig. 20 is a different relative position.
Fig. 22 is a plan view of the first three assembled parts of the puzzle, as viewed in the direction of the arrow 22 in the Fig. 21.
Fig. 23 is a section taken on the line 23—23 of Fig. 22.
Fig. 24 is a section similar to Fig. 23, but with the fourth piece of the puzzle inserted for final assembly, with the assembled pieces shown in Figs. 20 to 23.

The pieces A, B and C may, in their interlocked relation as shown in Fig. 20, be shifted relative to each other in the direction of the arrow 192 in Figs. 20, 21 and 22. Thus, the piece B may be slid between the pieces A and C from the position shown in Fig. 20 into the positions shown in Figs. 21 and 22, and vice versa. When the parts A, B and C assume the relative position shown in Fig. 22, the part C may be slid away from the other parts A and B until the side 124' of the key element 124 of the part C engages the T portion 112 of the part B.

For assembling the piece D with the previously assembled pieces A, B and C, the latter pieces are shifted into the relative position shown in Figs. 21, 22 and 25 in order to permit the insertion of the square portion 142 of the piece D into the gap 198 (Fig. 22) between the T portion 112 of the piece B and the superposed portions 124' and 84' of the key elements of the pieces C and A, respectively. With the square portion 142 of the piece D thus inserted into the gap 198, the same is in alignment, but not yet in interlocked relation, with the recess 199 (Figs. 22 and 23) which is formed by the T portion 112 and yoke 110 of the piece B, the superposed legs 123 and 94' of the pieces C and A, respectively, and the cross bar 90 of the piece A. When thus aligned with the recess 199, the square portion 142 of the piece D may be interlocked therewith by sliding the piece B from the position shown in Fig. 25 into that shown in Fig. 26. With the pieces A, B, C and D assembled and interlocked with each other as described, they assume the relative position shown in Figs. 26 and 27.

Figure 32:
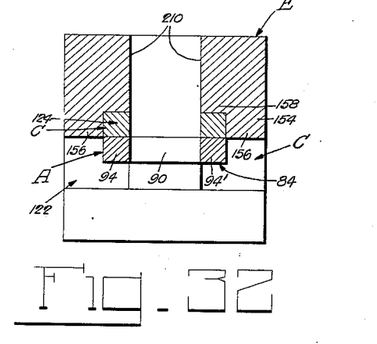
Figs. 32 and 33 are sections taken on the lines 32—32 and 33—33, respectively, of Fig. 31.
Figure 33:
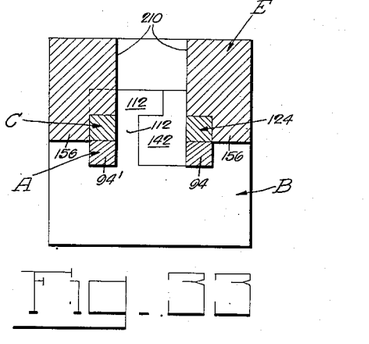
Figure 34:
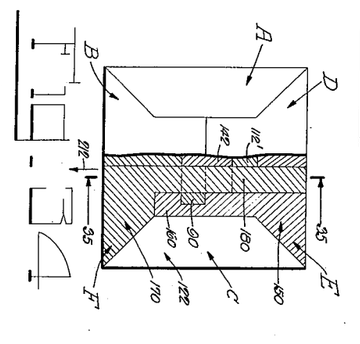
Fig. 34 is a view similar to Fig. 31, and showing the end piece of the puzzle assembled with the rest of the pieces thereof.
Figure 35:
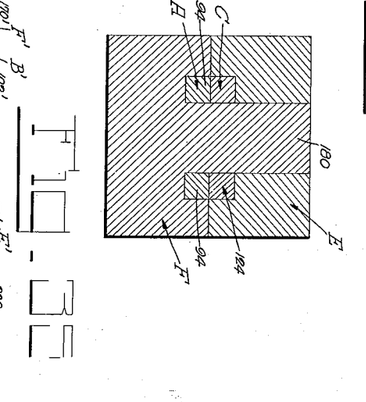
Fig. 35 is a section taken on the line 35—35 of Fig. 34.

Next, the piece A is retracted from interfitted relation with the interlocked pieces B and D until the cross bar 90 of the piece A engages the elements B and D (Figs. 28 and 29) in order to admit the next piece E into interfitting relation with the piece C in the direction of the arrow 201 in Fig. 30. More particularly, retraction of the piece A from interfitted relation with the interlocked pieces B and D, as described, provides for the admission of the tongue 160 of the piece E into the opening 203, the length and width of which are shown in Figs. 27 and 29, respectively. When the piece E is thus inserted into the partly assembled puzzle (Fig. 30), the groove 164 in the tongue 160 of the piece E is in alignment with the cross bar 90 of the piece A, and is interlocked therewith on reshifting the latter into interfitted relation with the interlocked pieces B and D (Fig. 31). The re-shift of the piece A into interfitted relation with the interlocked pieces B and D clears the passage 210 in the partly assembled puzzle (Figs. 31, 32 and 33) for the fitted reception of the tongue 180 of the end piece E to be inserted (Fig. 34). When the end piece F is thus inserted, the puzzle is finished (Fig. 36), and the tongue 180 of the end piece F locks the piece A against retraction from the pieces B and D and, hence, prevents the disassembly of the puzzle, as is now obvious from the preceding description. It also follows from the preceding description that the puzzle may be completed only when assembling the pieces thereof in the order described herein. When the puzzle is assembled, the tongue 180 of the end piece F extends, in the present instance, completely through the piece E (Figs. 34, 35 and 36), though this is by no means necessary. If the tongue 180 of the end piece F extends completely through the piece E as shown, the end of the tongue 180 exposed on the outer surface of the piece E may well indicate to an observant worker of the puzzle how to start its disassembly. Also, the exposed end of the tongue 180 on the outer surface of the piece E may serve as a convenient anchorage for a key chain, for instance, in connection with which the puzzle may be used. Such a chain (not shown) would necessarily be of a thickness to permit sufficient withdrawal of the end piece F from the assembled pieces and sufficient retraction of the piece A from interfitting relation with the parts B and D, for the assembly and disassembly of the puzzle.

In taking the puzzle apart, the end piece F thereof is first removed from the puzzle in the direction of the arrow 212 in Fig. 34, leaving the puzzle in the condition shown in Fig. 31. The piece A is next retracted from the position shown in Fig. 31 to that shown in Fig. 30 in order to release the piece E from interlock with the piece A and permit the removal of the former piece from the puzzle in the direction of the arrow 213 in Fig. 30. On removal of the piece E from the puzzle (Figs 28 and 29), the pieces A and C may be relatively shifted toward each other into the position shown in Figs. 26 and 27 to permit the relative shift between the pieces B and D requisite for the release of the piece D from interlock with the piece B (Fig. 25). The same release of the piece D from interlock with the piece B may be accomplished by sliding the piece D relative to the piece B to the left as viewed in Fig. 29, in which case the piece C will follow the piece D into the relative position shown in Fig. 25, being taken along by the square portion 142 of the piece D which extends through the key element 124 of the piece C and then engages the portion 124' of the latter. On release of the piece D from interlock with the piece B (Fig. 25), the former is removed from the remaining assembled pieces A, B and C in the direction of the arrow 205 in Fig. 25, leaving the latter pieces in the relation shown in Figs. 21 and 22. Next, the piece C is removed from the pieces A and B by first shifting it in the direction of the arrow 214 in Fig. 22 to release it from interlock with the T portion 112 of the piece B, and then passing it with its key element 124 over and away from the T portion of the piece B, as will be readily understood. The remaining pieces A and B (Fig. 19) may then readily be disassembled in a self-suggestive manner.

Figure 38:
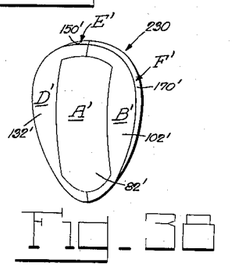

As earlier mentioned, the present invention may be embodied in puzzles which may be in the form of various geometric bodies or simulate different objects. In this connection, reference is had to Figs. 37 to 39, inclusive, which show a modified puzzle 230 of egg shape. The several, in the present instance six, pieces A', B', C', D', E' and F' of this modified puzzle may be provided with the same characteristic key elements as the corresponding pieces A, B, C, D, E and F of the above-described puzzle 70. However, the bases 82', 102', 122', 132', 150', and 170' of the respective piece A', B', C', D', E' and F' are, due to the different shape of the instant puzzle 230, differently formed than the bases of the corresponding parts A to F of the puzzle 70. Also, while the bases of the pieces A to F of the puzzle 70 interfit with each other in part along their meeting beveled sides as indicated at 232 in Fig. 36, for instance, the bases of the pieces of the modified puzzle 230 may be so constructed that they interfit with each other, by way of example, along rectangularly disposed meeting surfaces thereof, as is shown in Fig. 39 in which the end piece F' is partly removed from the puzzle in the direction of the arrow 233. Due to the provision on the pieces A' to F' of the modified puzzle 230 of the same characteristic key elements as those provided on the corresponding parts A to F of the puzzle 70, it stands to reason that the modified puzzle 230 is worked in the same manner as the puzzle 70. In view of this, it is deemed unnecessary to give any further description of the construction of the pieces A' to F' of the instant puzzle 230, or of the mode of their assembly or disassembly.

Figures 67, 68, 69:
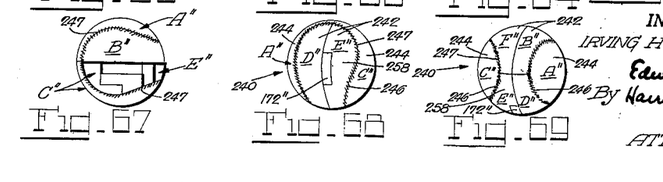
Fig. 67 shows the partly assembled puzzle of Fig. 66 when viewed in a direction opposite to that in which it is viewed in Fig. 66.
Figs. 68 and 69 are different views of the fully assembled third puzzle.

Reference is now had to Figs. 68 and 69 which show another modified puzzle 240 that resembles, by way of example, a baseball having the usual cover flaps 242 and 244 which are customarily joined along their seam by stitches 246. The instant puzzle 240 is, like the puzzle 70, composed of six different pieces A'', B'', C'', D'', E'' and F'', which may be provided with the same characteristic key elements as the corresponding pieces A to F of the puzzle 70. Due to the spherical shape of the instant puzzle 240, the bases of the pieces A'' to F'' are necessarily shaped differently than the bases of the corresponding pieces of the puzzle 70.

For a better understanding of the construction of the instant puzzle 240, the individual pieces A'' to F'' thereof are illustrated in Figs. 40 to 58, inclusive. Thus, Figs. 40 to 43, inclusive, show the piece A'', the same having a base 82'' and a projecting key element 84'' of which the latter is of the same characteristic construction as the key element 84 of the corresponding piece A of the puzzle 70. The base 82'' of the piece A'' is, as already mentioned, differently shaped than the base 82 of the corresponding piece A of the puzzle 70, and is primarily characterized by its part-spherical outer surface 250 which forms a part, and more exactly one-half, of the cover flap 244 of the baseball (Fig. 69). The configuration of the base 82'' of the piece A'' is in other respects also different from that of the base 82 of the piece A of the puzzle 70, but no detailed description of such further configuration of the base 82'' is deemed necessary, particularly since the form of the latter may, aside from its outer part-spherical surface 250, be selected from the point of view of making the base of the simplest possible form for reasons of economy in molding or machining the piece A'', and of accurately interfitting the base 82'' of the piece A'' with the bases of the adjacent pieces of the instant puzzle.

Figures 40, 41, 42, 43, 44, 45, 46, 47, 48, 49, 50, 51, 52, 53, 54, 55, 56, 57, 58, 59, 60, 61, 62, 63, 64, 65, 66:
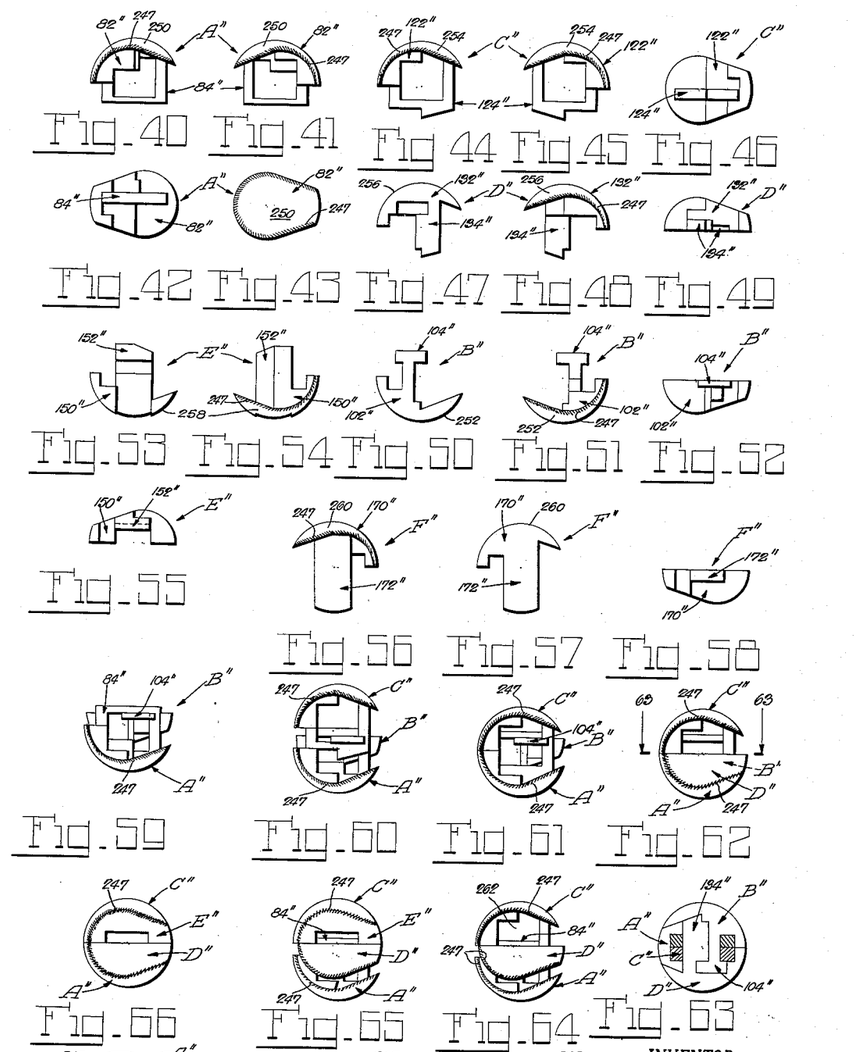
Figs. 40 and 41 are front and rear elevational views, respectively, of a piece of a third puzzle which embodies the present invention in a further modified manner.
Figs. 42 and 43 are bottom and top plan views, respectively, of the piece shown in Figs. 40 and 41.
Figs. 44, 45 and 46 are front and rear elevational views and a bottom plan view, respectively, of another piece of the third puzzle.
Figs. 47, 48 and 49 are front and rear elevational views and a bottom plan view, respectively, of a third piece of the third puzzle.
Figs. 50, 51 and 52 are front and rear elevational views and a bottom plan view, respectively, of a fourth piece of the third puzzle.
Figs. 53, 54 and 55 are front and rear elevational views and a bottom plan view, respectively, of a fifth piece of the third puzzle.
Figs. 56, 57 and 58 are front and rear elevational views and a bottom plan view, respectively, of the sixth and final piece of the third puzzle.
Fig. 59 shows the first two pieces of the third puzzle in initially assembled relation, ready for the reception of the third piece.
Fig. 60 shows the third piece of the third puzzle in initially assembled relation with the first two pieces thereof.
Fig. 61 shows two of the three initially assembled pieces in their final assembled relation.
Fig. 62 shows the fourth piece of the third puzzle in its final assembled relation with the first three pieces thereof.
Fig. 63 is a section taken on the line 63—63 of Fig. 62.
Fig. 64 shows the first four assembled pieces of the third puzzle conditioned for the reception of the fifth piece thereof.
Fig. 65 is a view similar to Fig. 64, and shows the fifth piece of the third puzzle assembled with the first four pieces thereof.
Fig. 66 is a view similar to Fig. 65, but illustrating the manner in which the partly assembled puzzle is conditioned for the reception of the sixth and final piece thereof.

Figs. 50 to 52, inclusive, show the piece B'' which is provided with a base 102'' and a key element 104'' of which the latter is of the same characteristic construction as the key element 104 of the corresponding piece B of the puzzle 70. Like the base 82'' of the piece A'' and the bases of the other pieces of the instant puzzle 240, the base 102'' of the piece B'' is differently shaped than the base of the corresponding piece B of the puzzle 70. Thus, the base 102'' of the piece B'' is, for instance, provided with an outer part-spherical surface 252 which forms a part, and more exactly one-quarter, of the cover flap 242 of the assembled baseball puzzle 240 (Fig. 69).

Figs. 44 to 46, inclusive, show the piece C'' which comprises a base 122'' and a key element 124'' of which the latter is of the same characteristic construction as the key element 124 of the corresponding piece C of the puzzle 70. The base 122'' of the piece C'' is provided with an outer part-spherical surface 254 which in the assembled puzzle forms a part, and more exactly one-half, of the cover flap 244 of the baseball (Figs. 68 and 69).

Figs. 47 to 49, inclusive, show the piece D'' which comprises a base 132'' and a key element 134'' of which the latter is of the same characteristic construction as the key element 134 of the corresponding piece D of the puzzle 70. The outer surface 256 of the base 132'' of the piece D'' is part-spherical and forms a part, and more exactly one-quarter, of the cover flap 242 of the assembled baseball puzzle 240 (Figs. 68 and 69).

Figs. 53 to 55, inclusive, show the piece E'' which comprises a base 150'' and a key element 152'' of which the latter is of the same characteristic construction as the key element 152 of the corresponding piece E of the puzzle 70. The outer surface 258 of the base 150'' of the piece E'' is part-spherical and forms a part, and more exactly one-quarter, of the cover flap 242 of the assembled baseball puzzle 240 (Figs. 68 and 69).

Figs. 56 to 58, inclusive, show the end piece F'' which comprises a base 170'' and a key element 172'' of which the latter is of the same characteristic construction as the key element 172 of the corresponding end piece F of the puzzle 70. The outer surface 260 of the base 170'' of the piece F'' is part-spherical and forms a part, and more exactly one-quarter, of the cover flap 242 of the assembled baseball puzzle 240 (Fig. 69).

The assembly of the pieces A'' to F'' of the instant puzzle 240 is the same as the assembly of the corresponding pieces of the puzzle 70 and, hence, requires little explanatory description. However, Figs. 59 to 67, inclusive, illustrate progressive steps in the assembly of the pieces A'' to F'' which will give a clear understanding of the mode in which these pieces are assembled. Thus, the pieces A'' and B'' are initially assembled by interlocking their key elements 84'' and 104'' in the fashion shown in Fig. 59. With the pieces A'' and B'' in the initially assembled relation shown in Fig. 59, it is possible to bring the next piece C″ into initially assembled relation with the pieces A″ and B″ as is shown in Fig. 60. The piece C″ may thereupon be shifted into its final assembled relation with the piece A″ (Fig. 61). With the pieces A″, B″ and C″ in the relative disposition shown in Fig. 61, it is possible to insert the next piece D″ so that its key element 134″ will be in alignment, but not yet in interlocking engagement, with the key element 104″ of the piece B″. Such interlock between the key elements 134″ and 104″ of the pieces D″ and B″ is accomplished on sliding the latter piece into its final assembled relation with the piece A″ (Figs. 62 and 63). Next, the piece A″ is retracted from the other assembled pieces B″, C″ and D″ (Fig. 64) for removing its key element 84″ from the path of the key element 152″ of the piece E″ next to be inserted into the passage 262 between the piece C″ and the interlocked pieces B″ and D″. On insertion of the piece E″ into the partly assembled puzzle (Fig. 65), the piece A″ is reshifted into its final assembled relation with the interlocked pieces B″ and D″ (Figs. 66 and 67), thereby interlocking its key element 84″ with the key element 152″ of the piece E″ last inserted. Next, the end piece F″ is inserted to complete the puzzle, the key element 172″ of the end piece F″ extending, in the present instance, through the piece E″ and being exposed at the outer surface 258 of the latter (Fig. 68), to be available for the convenient anchorage thereon of a key chain, for instance.

The simulated stitches 246 along the seam of the cover flaps 242 and 244 of the assembled baseball puzzle 240 may be formed by appropriate projections 247 on the outer exposed faces of the pieces thereof along those edges which meet in the assembled puzzle to define the seam of the cover flaps 242 and 244. In order to carry the deception of the singleness of either cover flap 242 or 244 even further, at least the outer exposed surfaces of the pieces of the puzzle which complement each other to form either cover flap, may be colored the same, but differently than the outer exposed surfaces of the puzzle pieces which complement each other to define the other cover flap.

It appears from the foregoing that the instant puzzle 240 may be completed only on assembling the pieces thereof in the order above-described. It is, therefore, also obvious that the puzzle 240 may be taken apart only on disassembling the pieces thereof in the reverse order in which they are assembled. In view of the above description of the assembly of the pieces of the puzzle 240, it is deemed that their disassembly is now quite obvious and requires no further description.

While the bases of the pieces A″ to F″ of the puzzle 240 may, as earlier mentioned, assume any desired configuration outside of their imperative part-spherical outer surfaces, they are, with the exception of the latter surfaces, preferably defined by flat planar surfaces throughout, so as to simplify the molds in which the pieces may be molded.

While I have shown and described the preferred embodiments of my invention, it will be understood that various changes may be made in the present invention without departing from the underlying idea or principles of the invention within the scope of the appended claims.

Having thus described my invention, what I claim and desire to secure by Letters Patent, is:

1. A three-dimensional take-apart puzzle, comprising six complementary pieces having outer portions, respectively, collectively defining the surface of a body of predetermined shape in the assembled relation of said pieces, one of said pieces being an end piece and inwardly projecting key elements, respectively, of which all except that of said end piece are interlocked with each other against relative movement in any direction in the assembled relation of said pieces, the key elements of two opposite pieces being of inverted U-shape with their bight portions positioned remote from their outer portions, respectively, of which the U element of one of said opposite pieces is shorter than that of the other opposite piece, a second piece of said six complementary pieces having an element insertable through the U element of said one piece and shaped to interlock therewith against relative movement between them in a first direction widthwise of the latter U element, and the U element of said other piece being passable over said element of said second piece into inverted superposed relation with the U element of said one piece in which said element of said second piece and U elements are interlocked against relative movement in a second direction thicknesswise of said superposed U elements but free for relative movement in a third direction longitudinally of the latter, a third piece of said six complementary pieces having a key element insertable in both of said U elements in juxtaposition to said second piece element, and shaped so as to be shiftable in said third direction into interlock with said second piece element and with the U element of said other piece in which the latter element is held against movement in said first direction and said third piece element is held against movement in said first and second directions, the key element of a fourth piece being insertable in the U element of said other piece to be held thereby against relative movement between them in said first direction, and being shaped to interlock with the U element of said one piece against relative movement between them in said second and third directions on relative movement of said opposite pieces toward each other in said third direction, and the key element of said end piece being insertable in said U elements to lock said second piece and third piece elements and U elements against relative movement in said third direction, each of said U elements comprising opposite side bars and a connecting bight portion and said element of said second piece comprising a recessed portion having a bottom and a T-shaped portion projecting from said bottom of which said recessed portion receives the opposite side bars of the U element of said one piece and said T portion overlaps one side bar of the U elements of said other piece in its superposed relation with the U element of said one piece.

2. A three-dimensional take-apart puzzle, comprising six complementary pieces having outer portions, respectively, collectively defining the surface of a body of predetermined shape in the assembled relation of said pieces, one of said pieces being an end piece and inwardly projecting key elements, respectively, of which all except that of said end piece are interlocked with each other against relative movement in any direction in the assembled relation of said pieces, the key elements of two opposite pieces being of inverted U-shape with their bight portions positioned remote from their outer portions, respectively, of which the U element of one of said opposite pieces is shorter than that of the other opposite piece, a second piece of said six complementary pieces having an element insertable through the U element of said one piece and shaped to interlock therewith against relative movement between them in a first direction widthwise of the latter U element, and the U element of said other piece being passable over said element of said second piece into inverted superposed relation with the U element of said one piece in which said element of said second piece and U elements are interlocked against relative movement in a second direction thicknesswise of said superposed U elements but free for relative movement in a third direction longitudinally of the latter, a third piece of said six complementary pieces having a key element insertable in both of said U elements in juxtaposition to said second piece element, and shaped so as to be shiftable in said third direction into interlock with said second piece element and with the U element of said other piece, in which the latter element is held against movement in said first direction and said third piece element is held against movement in said first and second directions, the key element of a fourth piece being insertable in the U element of said other piece to be held thereby against relative movement between them in said first direction, and being shaped to interlock with the U element of said one piece against relative movement between them in said second and third directions on relative movement of said opposite pieces toward each other in said third direction, and the key element of said end piece being insertable in said U elements to lock said second piece and third piece elements and U elements against relative movement in said third direction, each of said U elements comprising opposite side bars and a connecting bight portion, said element of said second piece comprising a grooved portion having a bottom and a T-shaped portion having a stem projecting from said bottom and a cross member spaced from said grooved portion, of which the latter fittedly receives the side bars of the U element of said one piece and the stem of said T portion extends through said fittedly received U element and also through the superposed U element thereabove and engages the superposed arms of said U elements at one side thereof, and the U element of said other piece is widthwise movable into said superposed relation with said fittedly received U element and beneath the cross member of said T portion.

3. A three-dimensional take-apart puzzle, comprising six complementary pieces having outer portions, respectively, collectively defining the surface of a body of predetermined shape in the assembled relation of said pieces, one of said pieces being an end piece and inwardly projecting key elements, respectively, of which all except that of said end piece are interlocked with each other against relative movement in any direction in the assembled relation of said pieces, the key elements of two opposite pieces being of inverted U-shape with their bight portions positioned remote from their outer portions, respectively, of which the U element of one of said opposite pieces is shorter than that of the other opposite piece, a second piece of said six complementary pieces having an element insertable through the U element of said one piece and shaped to interlock therewith against relative movement between them in a first direction widthwise of the latter U element, and the U element of said other piece being passable over said element of said second piece into inverted superposed relation with the U element of said one piece in which said element of said second piece and U elements are interlocked against relative movement in a second direction thicknesswise of said superposed U elements but free for relative movement in a third direction longitudinally of the latter, a third piece of said six complementary pieces having a key element insertable in both of said U elements in juxtaposition to said second piece element, and shaped so as to be shiftable in said third direction into interlock with said second piece element and with the U element of said other piece in which the latter element is held against movement in said first direction and said third piece element is held against movement in said first and second directions, the key element of a fourth piece being insertable in the U element of said other piece to be held thereby against relative movement between them in said first direction, and being shaped to interlock with the U element of said one piece against relative movement between them in said second and third directions on relative movement of said opposite pieces toward each other in said third direction, and the key element of said end piece being insertable in said U elements to lock said second piece and third piece elements and U elements against relative movement in said third direction, each of said U elements comprising opposite side bars and a connecting bight portion, said element of said second piece comprising a grooved portion having a bottom and a T-shaped portion having a stem projecting from said bottom and a cross member spaced from said grooved portion, of which the latter fittedly receives the side bars of the U element of said one piece and the stem of said T portion extends through said fittedly received U element and also through the superposed U element thereabove and engages the superposed arms of said U elements at one side thereof, and the U element of said other piece is widthwise movable into said superposed relation with said fittedly received U element and beneath the cross member of said T portion, and the key element of said third piece extends into the superposed U elements and is overlapped by the cross member of said T portion and extends between the stem of the latter and the superposed bars of the U elements at the other side thereof.

4. A three-dimensional take-apart puzzle, comprising six complementary pieces having outer portions, respectively, collectively defining the surface of a body of predetermined shape in the assembled relation of said pieces, one of said pieces being an end piece and inwardly projecting key elements, respectively, of which all except that of said end piece are interlocked with each other against relative movement in any direction in the assembled relation of said pieces, the key elements of two opposite pieces being of inverted U-shape with their bight portions positioned remote from their outer portions, respectively, of which the U element of one of said opposite pieces is shorter than that of the other opposite piece, a second piece of said six complementary pieces having an element insertable through the U element of said one piece and shaped to interlock therewith against relative movement between them in a first direction widthwise of the latter U element, and the U element of said other piece being passable over said element of said second piece into inverted superposed relation with the U element of said one piece in which said element of said second piece and U elements are interlocked against relative movement in a second direction thicknesswise of said superposed U elements but free for relative movement in a third direction longitudinally of the latter, a third piece of said six complementary pieces having a key element insertable in both of said U elements in juxtaposition to said second piece element, and shaped so as to be shiftable in said third direction into interlock with said second piece element and with the U element of said other piece in which the latter element is held against movement in said first direction and said third piece element is held against movement in said first and second directions, the key element of a fourth piece being insertable in the U element of said other piece to be held thereby against relative movement between them in said first direction, and being shaped to interlock with the U element of said one piece against relative movement between them in said second and third directions on relative movement of said opposite pieces toward each other in said third direction, and the key element of said end piece being insertable in said U elements to lock said second piece and third piece elements and U elements against relative movement in said third direction, each of said U elements comprising opposite side bars and a bight portion, and the key element of said fourth piece being a tongue fittedly insertable between the opposite side bars of the U element of said other piece and having a groove for interlock with the bight portion of the U element of said one piece.

5. A three-dimensional take-apart puzzle, comprising six complementary pieces having outer portions, respectively, collectively defining the surface of a body of predetermined shape in the assembled relation of said pieces, one of said pieces being an end piece and inwardly projecting key elements, respectively, of which all except that of said end piece are interlocked with each other against relative movement in any direction in the assembled relation of said pieces, the key elements of two opposite pieces being of inverted U-shape with their bight portions positioned remote from their outer portions, respectively, of which the U element of one of said opposite pieces is shorter than that of the other opposite piece, a second piece of said six complementary pieces having an element insertable through the U element of said one piece and shaped to interlock therewith against relative movement between them in a first direction widthwise of the latter U element, and the U element of said other piece being passable over said element of said second piece into inverted superposed relation with the U element of said one piece in which said element of said second piece and U elements are interlocked against relative movement in a second direction thicknesswise of said superposed U elements but free for relative movement in a third direction longitudinally of the latter, a third piece of said six complementary pieces having a key element insertable in both of said U elements in juxtaposition to said second piece element, and shaped so as to be shiftable in said third direction into interlock with said second piece element and with the U element of said other piece in which the latter element is held against movement in said first direction and said third piece element is held against movement in said first and second directions, the key element of a fourth piece being insertable in the U element of said other piece to be held thereby against relative movement between them in said first direction, and being shaped to interlock with the U element of said one piece against relative movement between them in said second and third directions on relative movement of said opposite pieces toward each other in said third direction, and the key element of said end piece being insertable in said U elements to lock said second piece and third piece elements and U elements against relative movement in said third direction, each of said U elements comprising opposite side bars and a bight portion the key element of said fourth piece being a tongue fittedly insertable between the opposite side bars of the U element of said other piece and having a groove for interlock with the bight portion of the U element of said one piece, and the key element of said end piece being another tongue fittedly insertable between the opposite superposed side bars of said U elements and interposed between said elements of said second and third pieces on the one side and the interlocked bight portion of the U element of said one piece on the other side.

IRVING HARTLEY STEINHARDT.

REFERENCES CITED

The following references are of record in the file of this patent:

UNITED STATES PATENTS

| Number | Name | Date |
|---|---|---|
| 1,099,159 | Banic | June 9, 1914 |
| 1,189,527 | Barnhardt | July 4, 1916 |
| 1,521,808 | Fox | Jan. 6, 1925 |
| 1,546,024 | Reichenbach | July 14, 1925 |
| 2,178,190 | Steinhardt | Oct. 31, 1939 |